United States Patent [19]

Frantti

[11] Patent Number: 4,761,107

[45] Date of Patent: Aug. 2, 1988

[54] APPARATUS FOR TRANSFERRING COMPONENTS TO AND FROM CONTAINERS

[75] Inventor: Edsel W. Frantti, Penn Hills Township., Allegheny County, Pa.

[73] Assignee: Westinghouse Electric Corp., Pittsburgh, Pa.

[21] Appl. No.: 875,913

[22] Filed: Jun. 19, 1986

[51] Int. Cl.⁴ ............................................. G21C 19/00
[52] U.S. Cl. ..................................... 414/146; 376/264
[58] Field of Search ............... 414/146, 147, 150, 154; 376/261, 264, 268

[56] References Cited

U.S. PATENT DOCUMENTS

| | | | |
|---|---|---|---|
| 3,910,006 | 10/1975 | James ................................ | 414/146 X |
| 3,940,577 | 2/1976 | Christofer ......................... | 414/146 X |
| 4,069,766 | 1/1978 | Bernstein .......................... | 414/146 X |
| 4,649,016 | 3/1987 | Hardin .............................. | 414/146 X |

Primary Examiner—David H. Corbin
Attorney, Agent, or Firm—D. C. Abeles

[57] ABSTRACT

Apparatus for transferring components, particularly rod control cluster elements for a nuclear reactor, to and from containers, particularly fuel assemblies, with the aid of a movable carriage containing compartments for receiving at least one fuel assembly and at least one rod control cluster element. The carriage is mounted on tracks and carries an abutment member arranged to cooperate with stops which delimit respective positions of the carriage along the tracks. When the carriage is at least in some of its positions, a respective compartment is located directly below a vertically movable gripper which is operable for gripping a rod control cluster element. In order to allow the carriage to have more than two positions, there is provided a movable stop which can be lowered to permit the carriage abutment member to move therepast and raised to be contacted by the abutment member. Movements of the carriage and gripper are controlled by means of pushbuttons located at a station accessible to an operator and via a data processing system which is responsive to actuation of the pushbuttons to effect the indicated operation.

13 Claims, 10 Drawing Sheets

LOAD POSITION (LOAD)

FIG. 3b

FIRST INTERMEDIATE POSITION (INT 1)

FIG. 3c

FUEL CELL 1 POSITION (FC 1)

FIG. 3d

SECOND INTERMEDIATE POSITION (INT 2)

FIG. 3e

ROD CONTROL CLUSTER STORAGE POSITION (RCC)

FIG. 3f

FUEL CELL 2 POSITION (FC 2)

APPARATUS FOR TRANSFERRING COMPONENTS TO AND FROM CONTAINERS

BACKGROUND OF THE INVENTION

The present invention relates to apparatus for the mechanized transfer of objects to and from containers, and particularly to apparatus which enables such operations to be controlled from a distance.

In many industrial situations, objects must be transferred from one location to another in a precisely controlled manner by means of power operated conveying devices either because of the size and/or weight of the objects or because the objects constitute a hazard to operating personnel.

All of these considerations exist when it is necessary to replace or transfer large components of a nuclear reactor. A particular case of this type involves the exchange of rod control cluster (RCC) elements in a fuel assembly for a reactor core. Specifically, a reactor core includes a plurality of fuel assemblies each of which contains an RCC element which must be replaced from time to time. Such replacement involves lifting out of the RCC element previously installed therein, transfer of that RCC element to a holding position, and then installation of a new RCC element. The movements involved in each of these operations must be precisely controlled by an operator who can view the operation while being isolated from the radioactive material of the elements and fuel assembly.

SUMMARY OF THE INVENTION

It is an object of the present invention to enable such operations to be carried out in a precisely controlled and reliable manner.

Another object of the invention is to permit accurate positioning of one or more fuel assemblies and accurate transfer of RCC elements to and from such assemblies.

These and other objects are achieved, according to the invention, by a novel apparatus for transferring components to and from containers therefor, which apparatus includes:

a stationary support frame defining a pathway;

a carriage movable along the pathway and having at least one first container compartment for receiving and holding a container and at least one first component compartment for receiving and holding a component, said container compartment being spaced from said component compartment along the pathway;

two stationary stops located to delimit first and second ends of the pathway;

a movable stop located along the pathway between said stationary stops;

abutment means carried by said carriage, and disposed to cooperate with said stops so that contact between said abutment means and said stationary stops defines respective first and second end operating positions of said carriage along said pathway and contact between said abutment means and said movable stop defines at least one further operating position of said carriage along said pathway, which further position is spaced from said second end position by a distance equal to the spacing between said container compartment and said component compartment;

component transfer means for transferring a component vertically to and from a respective one of said compartments when said carriage is in a respective one of said second end and further operating positions;

signal controllable drive means connected to said carriage for moving said carriage to a selected operating position along said pathway;

signal controllable movable stop displacing means coupled to said movable stop for displacing said movable stop between a raised position in which said movable stop can be contacted by said abutment means and a lowered position in which said movable stop can not be contacted by said abutment means; and electronic data processing means connected to receive signals indicative of the desired operating position of said carriage and connected to said drive means and movable stop displacing means for operating said drive means and said movable stop displacing means for automatically displacing said carriage to the desired operating position.

According to preferred embodiments of the invention, the containers are nuclear reactor core fuel assemblies and the components are RCC elements.

The carriage includes two container compartments each arranged to hold a respective fuel assembly and one first component compartment for receiving and temporatily holding an RCC element, the latter compartment being located between the fuel assembly compartments.

Preferably, the abutment means include two abutments spaced apart along the path of travel of the carriage and each arranged to cooperate with the movable stop to define a respective further operating position of the carriage.

The component transfer means includes a hoist supporting a pneumatically operated gripper, the hoist including a cable supporting the gripper and a motor-driven drum about which the cable is wound. An air hose is coupled between the gripper and a pressurized air source through the intermediary of an electrically controlled valve.

The carriage is driven by a motor via cables connected between respective ends of the carriage and respective ends of a chain which passes around a toothed wheel driven by the motor.

To avoid damage to the various motors as a result of overloads, the drum and the toothed wheel are coupled to their respective motors via slip clutches.

Displacement of the movable stop is effected by means of a lever pivoted by a solenoid controlled, pneumatic piston-cylinder assembly and coupled to the movable stop by a cable.

Rotation of the drum is monitored by a multi-position geared limit switch, while rotation of the toothed wheel which displaces the carriage is monitored by a position transducer which undergoes one cycle of rotation in response to movement of the carriage between the ends of its pathway. Limit switches associated with the piston-cylinder assembly indicate the position of the movable stop, while the state of the valve controlling the supply of air to the gripper is monitored in any suitable manner.

All of the monitoring indications are supplied to the electronic data processing means, along with signals supplied by the operator to indicate the operation to be performed.

According to a further feature of the invention, the operation of the system is controlled from a station which is connected to the electronic data processing means via a disconnectable cable. The station can be of the pendant type and is provided with a plurality of pushbuttons and a trigger switch, the pushbuttons indicating each operation to be performed and the trigger switch instructing the system to carry out the presently indicated operation. Preferably, in accordance with the invention, each pushbutton is transparent and houses an indicator lamp which is connected to the data processing means in such a manner that depression of the pushbutton produces a signal sequence such that the associated lamp initially produces a blinking light signal which changes to a steady light signal when the appropriate monitoring means indicates that the operation indicated by that pushbutton has been completed. Once an operation has been indicated by depression of a particular pushbutton, it is necessary to close the trigger switch in order to cause the operation to begin. During the course of the operation, the trigger switch condition is repeatedly interrogated so that if the trigger switch should be released, the operation is immediately halted.

The pushbuttons are arranged in groups, a first group controlling carriage displacement, a second group controlling hoist movement and a third group controlling gripper operation. Only one pushbutton can be effective at a time and all of the pushbuttons are interconnected, either electrically or mechanically, so that depression of one pushbutton, when the trigger switch is open, will deactuate the previously pressed pushbutton. However, if the trigger switch is closed, pressing of a pushbutton will not halt the operation indicated by the previously pressed pushbutton.

The movable stop is provided in order to enable the carriage to be halted at one or more further operating positions located between the ends of the carriage pathway. The movability of this stop allows the carriage to move past the position or positions defined thereby, when desired. The movable stop is pivotable between a raised position, in which it will engage a carriage abutment, and a lowered position, in which it permits movement of the carriage abutments past the location of the movable stop.

To assure accurate and reliable positioning of the carriage by means of the movable stop, the movable stop is associated with a fixed abutment member against which the movable stop bears when in its raised position and the operating positions defined by the movable stop are created when a respective abutment on the carriage presses against the movable stop from the side opposite the abutment member associated with the movable stop. Therefore, before the movable stop can be moved to its lowered position, the carriage must be moved to a position at which such movement of the movable stop is not prevented by a carriage abutment. For this purpose, the control system according to the present invention provides a respective intermediate position for each carriage position which is defined by the movable stop, each intermediate position being located to assure that the carriage abutment or abutments are clear of the movable stop before it is lowered.

Accurate positioning of the movable carriage at each of its operating positions is achieved, according to the present invention, by configuring the electronic control in such a manner that a carriage abutment will come into contact with an associated stop slightly before the data processing system indicates that the carriage has arrived at that position. Therefore, the motor driving the carriage continues to rotate through a small angle until the carriage position sensor produces an indication that the carriage has arrived at the desired position. This small additional rotation of the carriage drive motor thus occurs while the carriage is stationary and is absorbed by the ability of each cable connected to the carriage to undergo a small amount of elastic elongation.

According to a further feature of the invention, the station carrying the controls to be actuated by the operator is also provided with display members which are connected to indicate the load being supported by the hoist and/or the hoist vertical position. Information for these displays can be provided by a load cell operatively associated with the hoist and a position transducer driven by the hoist cable drum. The display members can be of the LED or LCD type and can be installed as an integral part of the station housing or as a separate device clamped to the cable which connects the station to the data processing system. The latter possibility enables such a display member to be retrofitted to an existing system. In either embodiment, a single display device can be provided and can be programmed to alternately display the two parameters.

DESCRIPTION OF THE PREFERRED EMBODIMENTS

Figure 1:
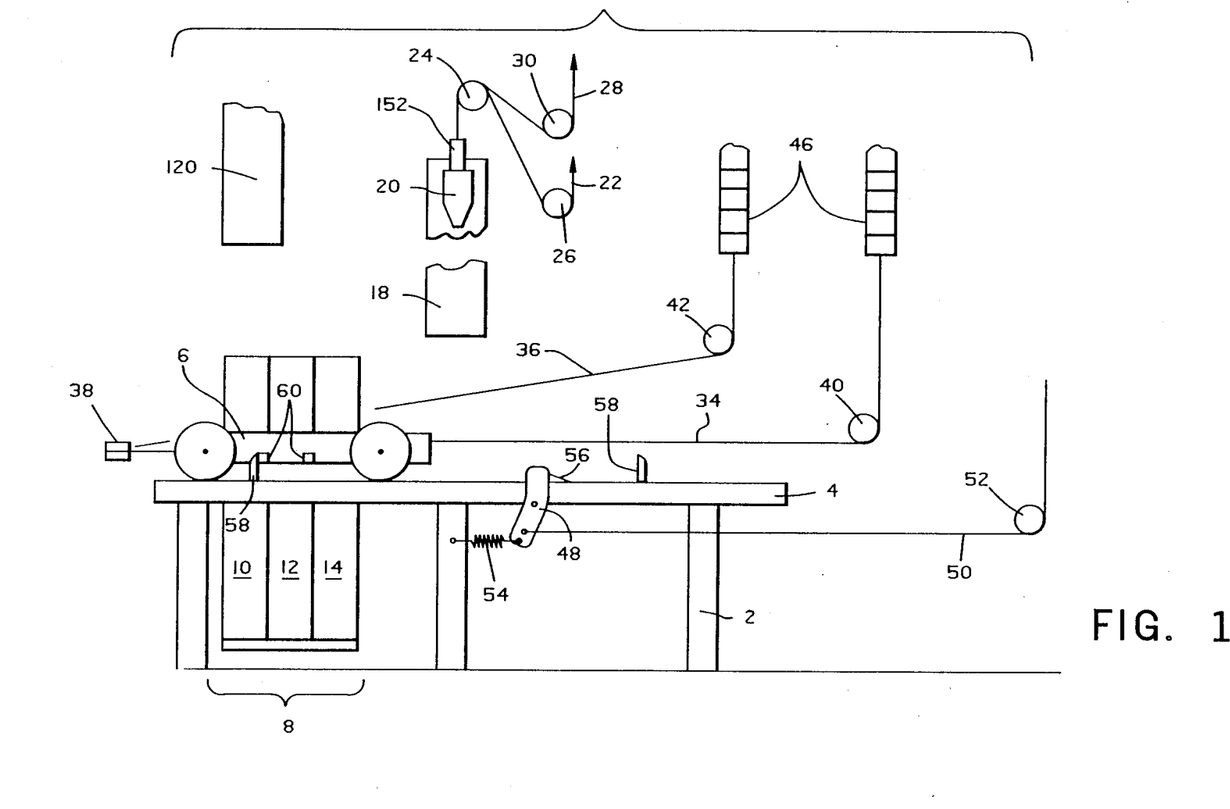
FIG. 1 is an elevational pictorial view of a preferred embodiment of a system according to the invention.

FIG. 1 shows an embodiment of a rod control cluster (RCC) changing fixture according to the invention. The fixture is mounted in a refueling canal of the reactor installation and includes a stationary frame 2 supporting horizontal tracks 4. A wheeled carriage 6 is mounted on tracks 4 to be movable therealong. Carriage 6 supports a container 8 that is formed to have three vertically extending compartments 10, 12 and 14.

The fixture further includes a stationary, vertically extending guide tube 18 mounted on the refueling canal wall and along which a gripper 20 can be displaced for raising and lowering an RCC element. Gripper 20 is displaced by a hoist including a cable 22 guided around pulleys 24 and 26. Gripper 20 is a pneumatically operated device which is supplied with air under pressure via a hose 28 which is guided around pulleys 24 and 30, pulley 24 being a double pulley having two concentric sheaves.

Gripper 20 is composed of flexure fingers which are locked in a radially extended position to grip an RCC element when air under pressure is not supplied thereto and which are retracted radially inwardly to not grip the RCC element when air under pressure is supplied. Thus, an RCC element will not be inadvertently released if the pressure air supply should fail.

When the flexure fingers are radially retracted, they can be extracted from, or inserted into, the RCC element. Typically, such an element is provided at the top with a lifting hub for gripper engagement.

Carriage 6 is displaced along track 4 by cables 34 and 36 passing around pulleys 38, 40 and 42. The free ends of cables 34 and 36 are connected to respective ends of a drive chain 46.

The structure of FIG. 1 further includes a movable stop 48 pivotable between raised and lowered positions by the action of a cable 50 guided around a pulley 52 and a tension spring 54 biasing stop 48 into its raised position, as shown in FIG. 1. The raised position of stop 48 is delimited by a stationary abutment 56. Frame 2 supports two fixed stops 58 each of which cooperates with the outer surface of a respective abutment 60 on carriage 6 to define a respective operating position of carriage 6. These operating positions are at the ends of the pathway along which carriage 6 moves. Stop 48 cooperates with the right-hand side of each abutment 60 to define a respective further operating position of carriage 6, these further operating positions being located between the end positions defined by stops 58.

Figure 2:
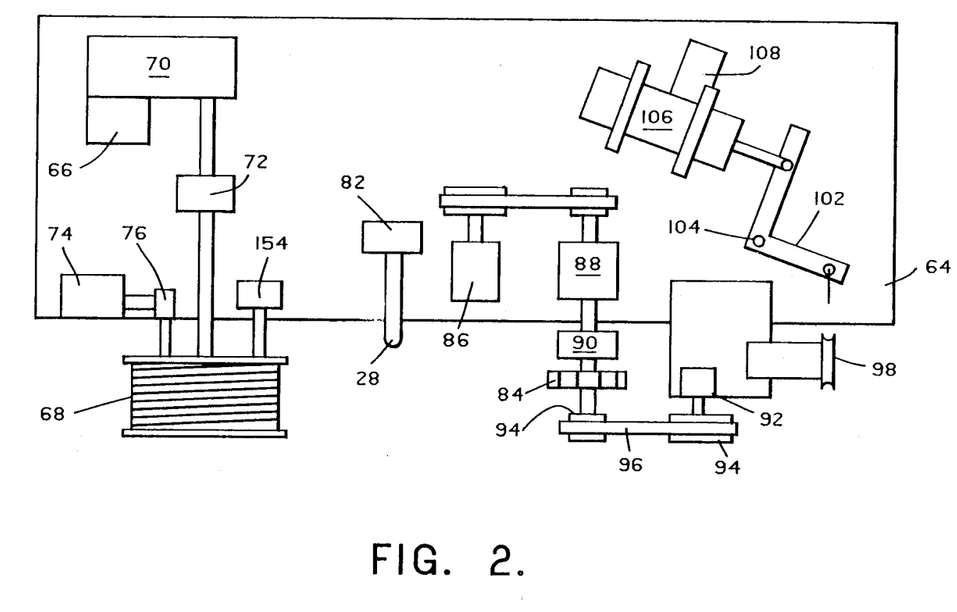
FIG. 2 is a plan view of the drive and monitoring devices for the system of FIG. 1.

FIG. 2 shows, in a plan view, the components for driving cables 22 and 50, and chain 46 and for supplying air under pressure to hose 28. These components are disposed on a horizontal platform 64 above the components shown in FIG. 1. Platform 64 is the operating deck of the refueling canal.

The hoist for gripper 20 further includes a motor 66 connected to drive a drum 68 via a speed reducer 70 and an overload-protecting slip clutch 72. Cable 22 is wound around drum 68. Speed reducer 70 is a conventional geared arrangement.

Drum 68 is coupled to an assembly of mechanical geared limit switches 74 via a gear coupling 76. Coupling 76 may, for example, be composed of a worm gear rotated by drum 68 and a spur gear rotated by the worm gear and directly driving switches 74. Switches 74 are composed of a plurality of cam-driven switches which can be set to indicate selected amounts of rotation of drum 68, and thus selected positions of the hoist carrying gripper 20. For purposes of this invention, switch 74 is set to indicate the following hoist positions:

a fully raised position where an RCC gripped by gripper 20 would be clear of carriage 8;

a fully lowered position where an RCC gripped by gripper 20 is fully inserted into a compartment 10, 12 or 14; and a parked zone where, if gripper 20 were holding an RCC, the RCC would extend partly into a compartment 10, 12, or 14 and prevent displacement of carriage 6, while if gripper 20 were not holding an RCC, displacement of carriage 6 would not be impeded. The parked zone can extend over a range having defined upper and lower limits.

The parked zone is between the raised and lowered positions.

The parked zone can be defined by two limit switch units as follows: a first unit is set to be open when the hoist is more than approximately 45 cm above its lowered position and closed when the hoist is less than 45 cm above its lowered position; and a second unit is set to be closed when the hoist is more than approximately 30 cm above its lowered position and open when the hoist is less than 30 cm above its lowered position. The hoist is in the parked zone when both units are closed and has a vertical extent of about 15 cm.

Switches 74 can be constituted by a commercially available device, such as a type CR115E geared limit switch manufactured by the General Electric Corporation.

Hose 28 is guided to move with gripper 20, and is connected to a pressurized air source 82 which is controllable by a solenoid controlled pneumatic selector valve in response to manually-generated control signals, which will be discussed later.

Chain 46 (FIG. 1), passes around a gear wheel 84 that is driven by a motor 86 via a speed reducer 88 and an overload-protecting slip clutch 90. Gear wheel 84 is additionally coupled to a position transducer 92 via a coupling, composed of sprockets 94 and a toothed belt 96, which prevents slippage between gear wheel 84 and transducer 92.

Cable 50 passes around a pulley 98 and is secured to the free end of one arm of a lever 102 pivotally mounted on platform 64 at a pivot 104. The free end of the other arm of lever 102 is connected to the piston of an electrically actuated, solenoid controlled pneumatic or hydraulic cylinder unit 106. Unit 106 carries a limit switch assembly 108 that provides indications of the axial position of the piston rod of unit 106, corresponding to the raised and lowered positions of stop 48.

In order to carry out the various operations to be performed by the fixture, carriage 6 is movable into four operating positions: LOAD POSITION; FUEL CELL 1 POSITION (FC1); ROD CONTROL CLUSTER STORAGE POSITION (RCC), and FUEL CELL 2 POSITION (FC2). Carriage 6 is additionally movable into two intermediate positions, INT1 and INT2, primarily to assure that raising and lowering of movable stop 48 will not be impeded by abutments 60. Each of these positions is shown in one of FIGS. 3a to 3f.

Figure 3A:
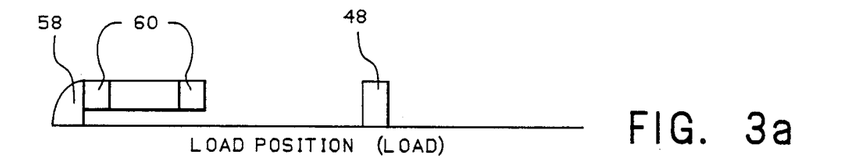
FIGS. 3a-3f are simplified pictorial views illustrating respective positions of the carriage of FIG. 1 along its displacement path.

In the position shown in FIG. 3a, which corresponds to that shown in FIG. 1, container 8 is ready to receive fuel assemblies 120. Each fuel assembly 120 is carried by a manipulator crane, which can be of any suitable known type. The crane is movable to place an assembly in, or remove an assembly from, either one of compartments 10 and 14, and an RCC element in or from compartment 12.

Figure 3B:
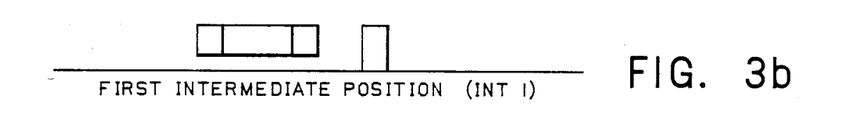

In position INT1, shown in FIG. 3b, carriage 6 is in a position such that abutments 60 are both a sufficient distance to the left of stop 48 to assure that abutments 60 will not interfere with movements of stop 48. Similarly, at INT2 shown in FIG. 3d, stop 48 is located between abutments 60 in a manner such that abutments 60 will not interfere with movements of stop 48.

In positions FC1 (FIG. 3c), RCC (FIG. 3e) and FC2 (FIG. 3f), respectively, carriage 6 is located so that compartments 14, 12 and 10, respectively, are below guide tube 18.

Movement of carriage 6 among these positions is effected by gear wheel 84 driven by motor 86, while the position and operating state of gripper 20 and the position of stop 48 are monitored to assure that carriage 6 can safely and reliably be moved to the desired position.

Figures 4, 4A:
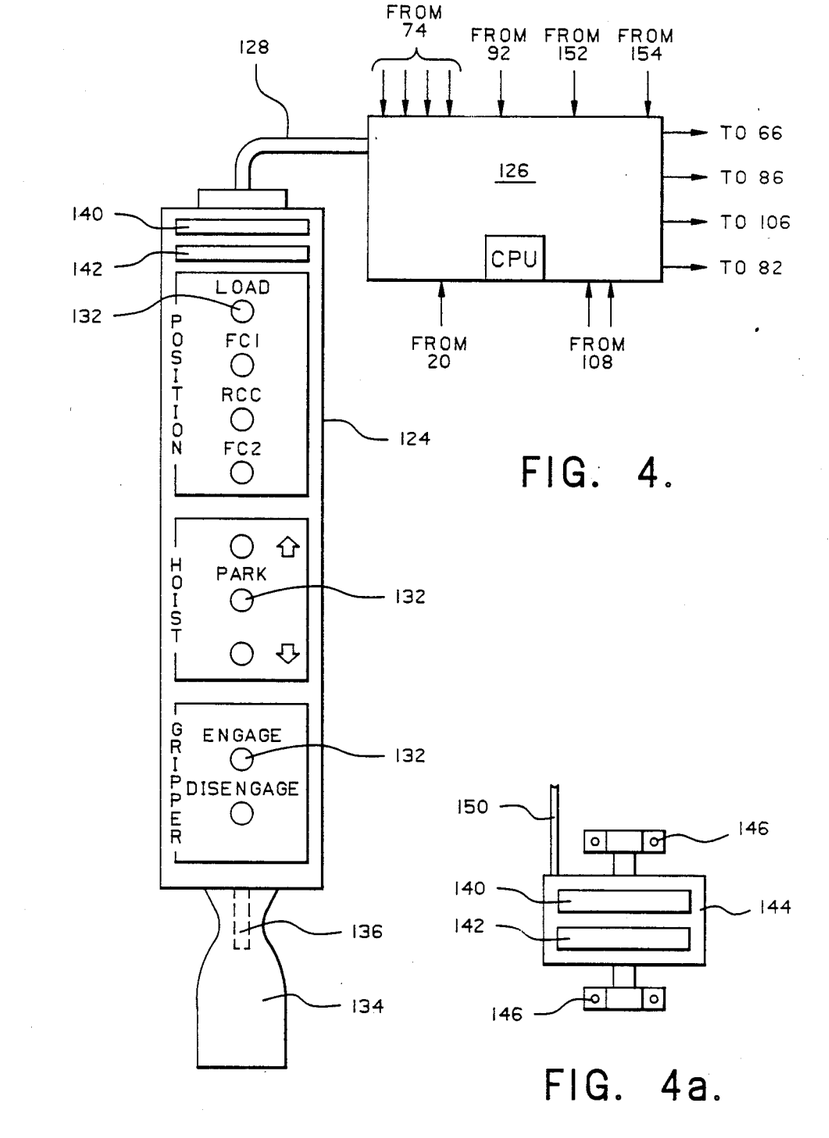
FIG. 4 shows, in elevation, a pendant station employed for controlling the operation of the system of FIGS. 1 and 2, together with a block diagram of the data processing system employed for receiving monitoring signals and generating control signals.
FIG. 4a is a detail pictorial view of a modified version of a portion of the pendant station of FIG. 4.

All movements of carriage 6 and gripper 20, as well as opening and closing of gripper 20, are controlled by instruction signals input at a control station 124 shown in FIG. 4. Station 124 is connected to a control computer 126 containing a central processing unit (CPU) and related signal processing and routing circuitry. Computer 126 receives instruction signals from station 124, and position signals from geared switch 74, transducer 92 and limit switches 108. In addition, if desired, limit switches can be associated with gripper 20 and can be connected to computer 126 to provide signals indicating the actual operating state of gripper 20. Computer 126 supplies drive signals to motors 66 and 86, to the control valve for piston unit 106, and to switchable source 82. The signal supplied to source 82 could be used to indicate the state of gripper 20, in place of limit switches associated with gripper 20. Computer 126 can be any suitable general purpose computer suitably programmed to respond to input signals from station 124 and transducer and limit switch status signals to suitably control the raising and lowering, and the opening and closing, of gripper 20, and the movements of carriage 6 to any of its four operating positions.

Transducer 92 is preferably a device which is set to undergo one full revolution as carriage 6 goes from its LOAD position to its FC2 position. Each of the positions shown in FIG. 3 is associated with a respective transducer output value. By way of example, the following relation could exist between the carriage operating positions and the transducer angular position:

LOAD=1°
FC1=197°
RCC=276°
FC2=358°.

Transducer 92 produces a digital output signal representative of its angular position and it is this signal which is supplied to computer 126. The associated angular positions of transducer 92 are selected to assure that carriage 6 reaches the associated position, i.e. a selected abutment 60 contacts the respective stop 48 or 58, just before transducer 92 reaches the associated angular position. Motor 86 then continues to rotate gear wheel 84 through a small distance until transducer 92 reaches the associated angular position. Cables 34 and 36 have sufficient elasticity to allow for this slight over-rotation of gear wheel 84.

Transducer 92 can be constituted by a known absolute encoder, such as a Series HRE or NRE Absolute Encoding System marketed by Astrosystems, Inc. of Lake Success, N.Y.

Figure 5:
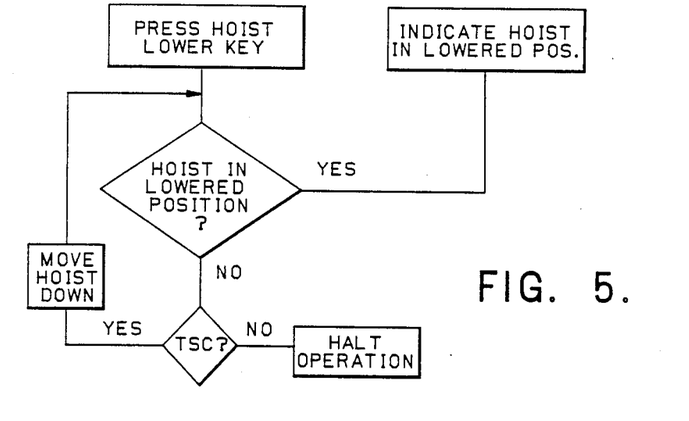
FIG. 5 is a programming flow diagram of a hoist lowering operation.
Figure 6:
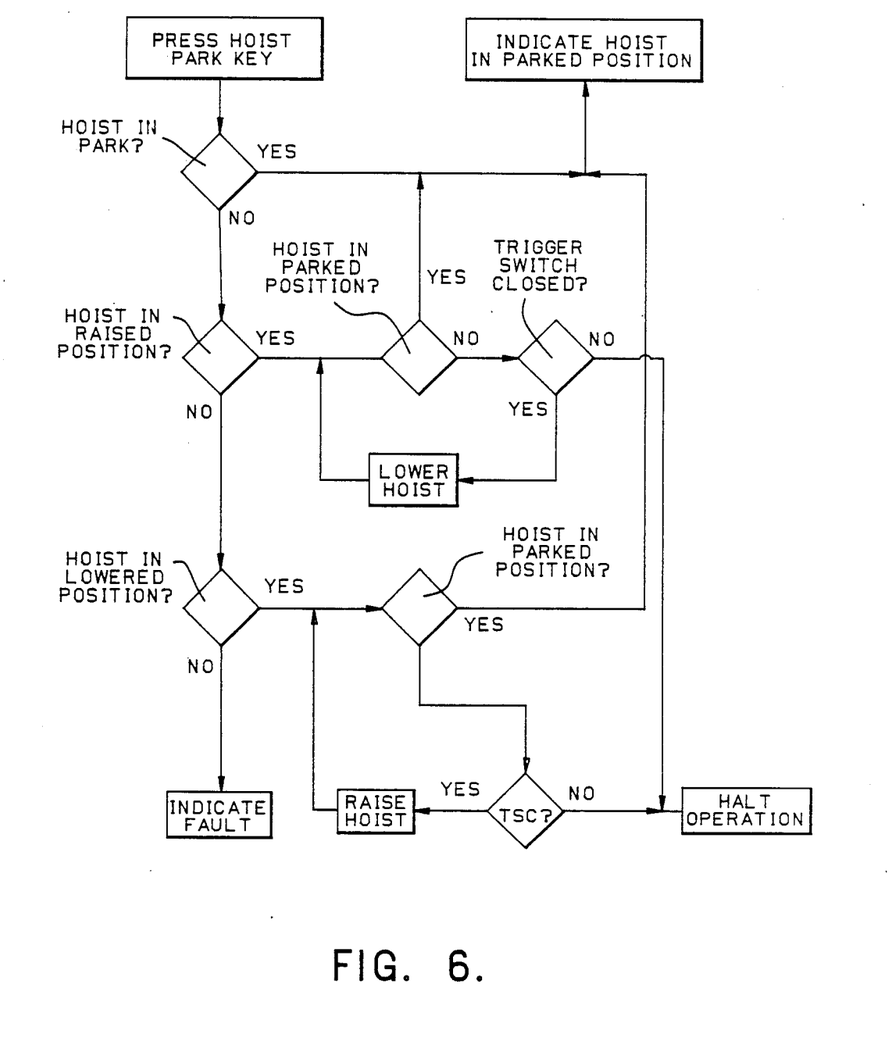
FIG. 6 is a programming flow diagram of the operation for moving the hoist to its parked zone.
Figure 7:
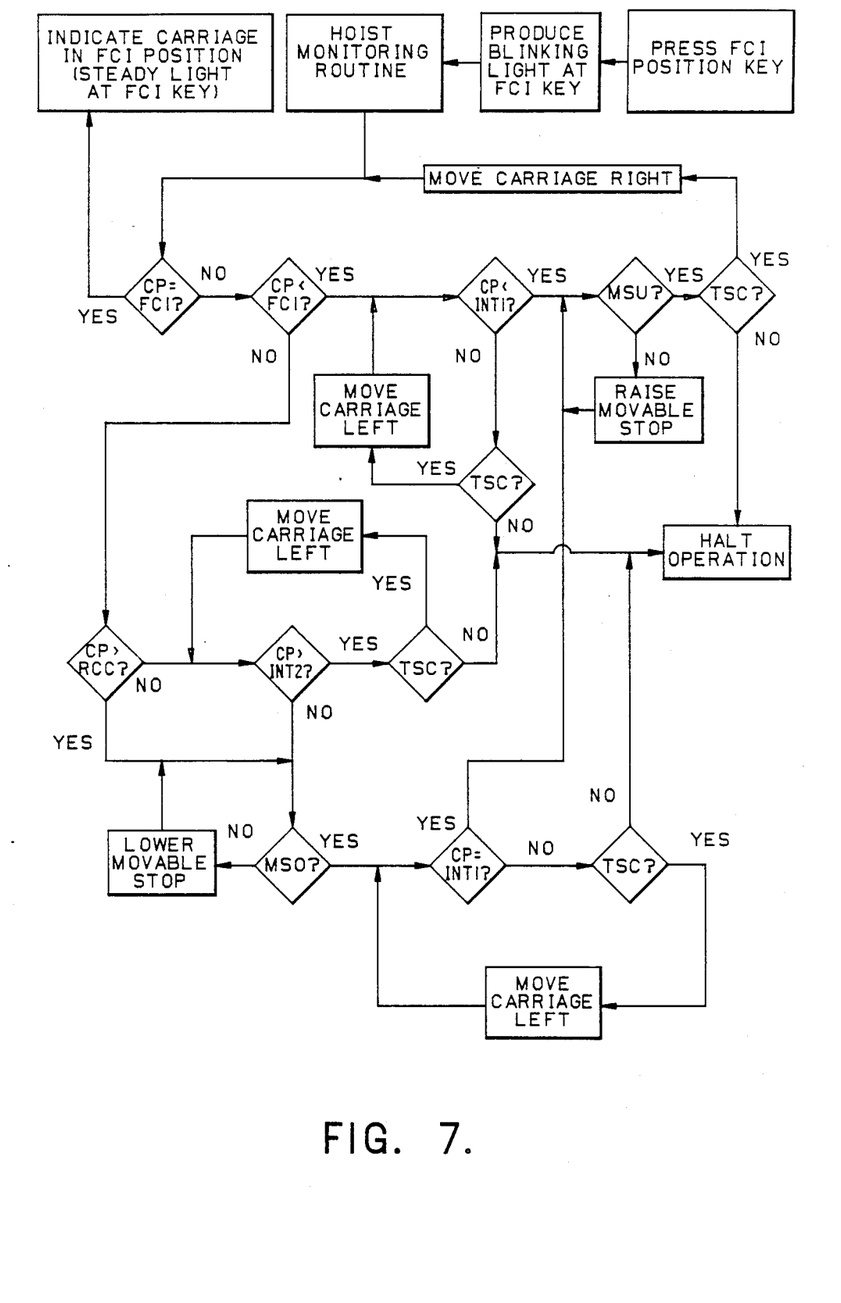
FIG. 7 is a programming flow diagram of displacement of the carriage to its fuel cell 1 (FC1) position.
Figure 8:
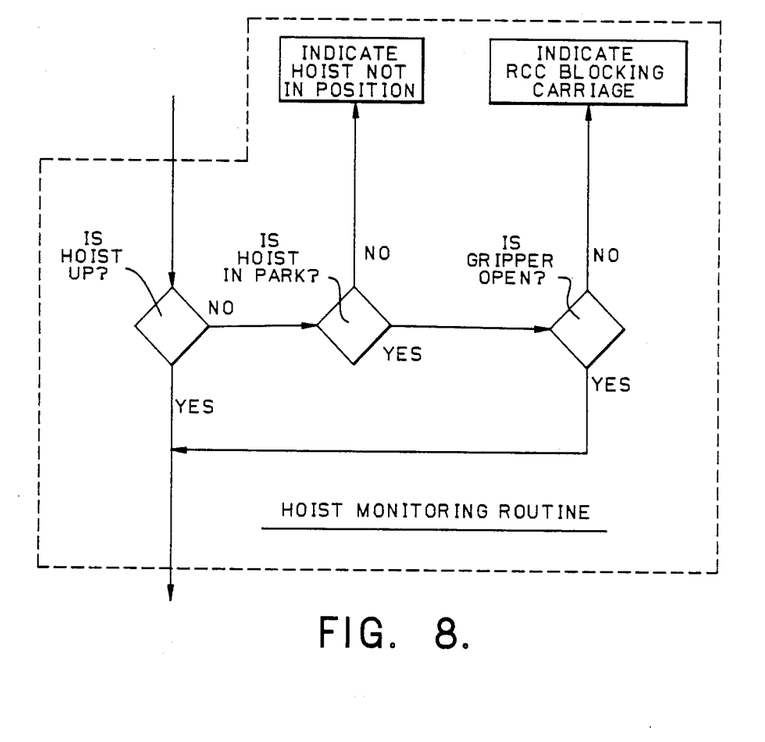
FIG. 8 is a programming flow diagram of one routine forming part of the operations depicted in FIGS. 7, 9, 10 and 11.
Figure 9:
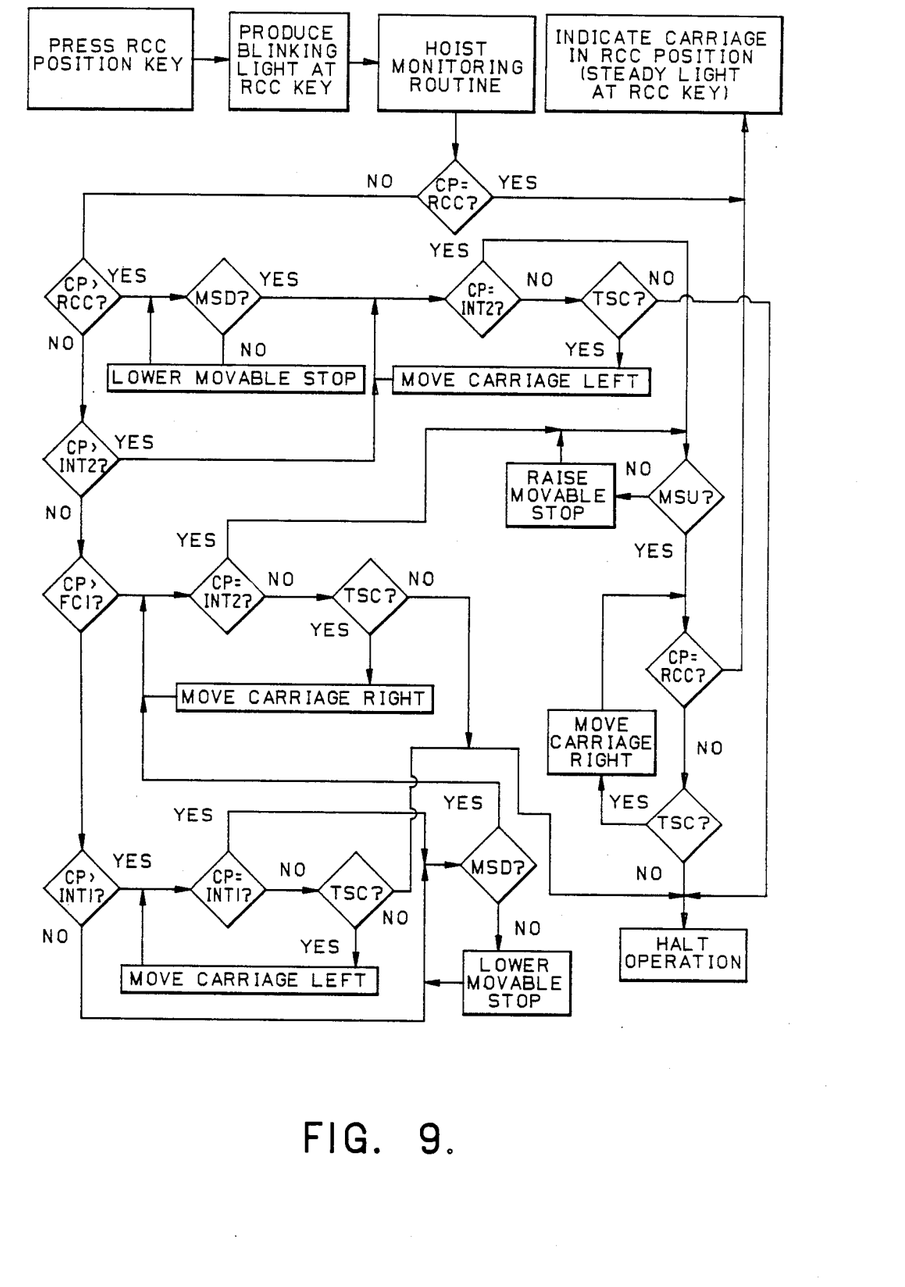
FIG. 9 is a programming flow diagram of displacement of the carriage to its rod control cluster (RCC) position.
Figure 10:
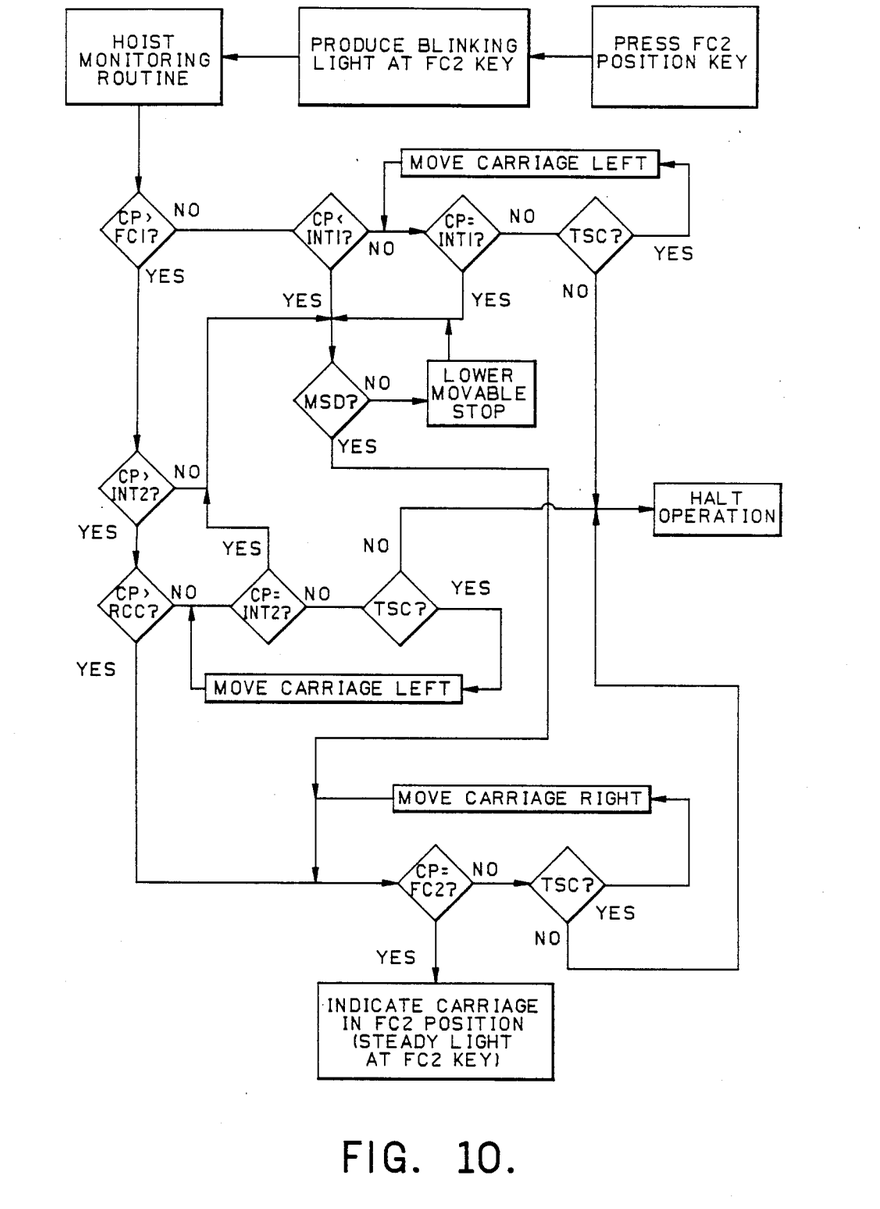
FIG. 10 is a programming flow diagram of diplacement of the carriage to its fuel cell 2 (FC2) position.
Figure 11:
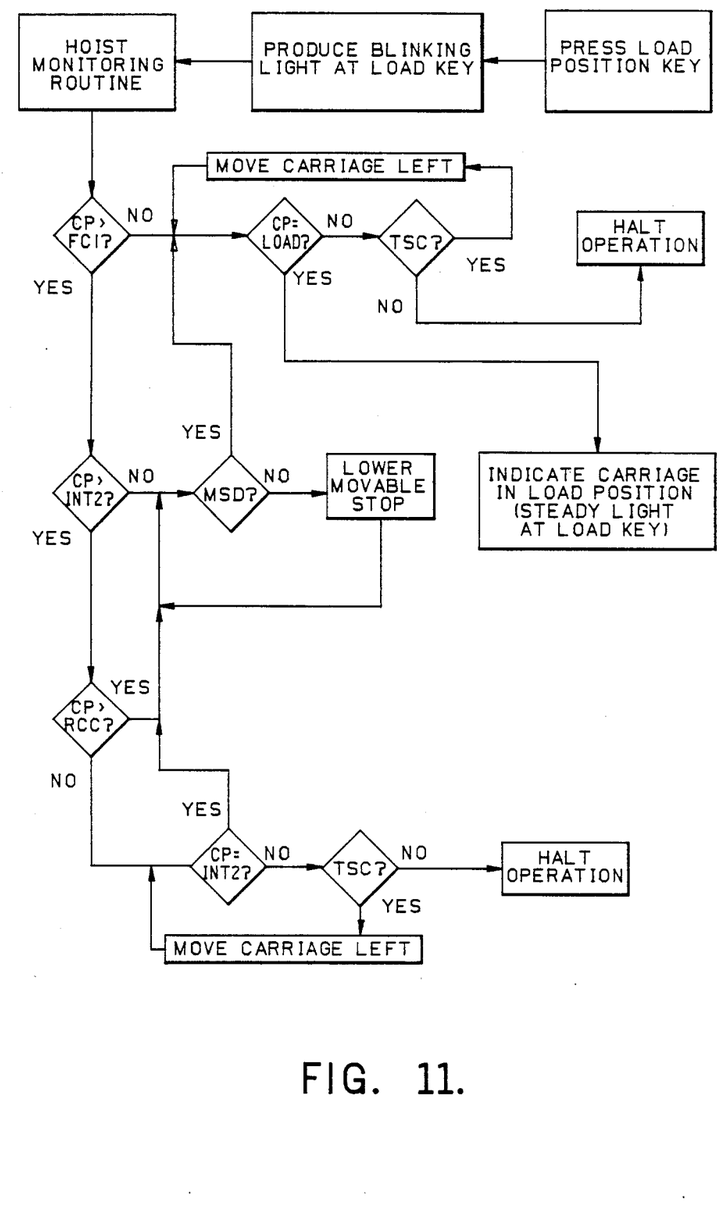
FIG. 11 is a programming flow diagram of displacement of the carriage to its load position.

Computer 126 can be programmed according to conventional programming practices to implement the various operations. This programming can be developed on the basis of the detailed programming flow diagrams shown in FIGS. 5-11, where FIGS. 5 and 6 depict the hoist lowering and parking operations and FIGS. 7-11 show the carriage movement operations. Hoist raising would be performed with a program similar to that of FIG. 5. The carriage displacement operations generally involve, wherever necessary, moving carriage 6 to an intermediate position, raising or lowering stop 48, and then moving the carriage to its desired position. Whenever an abutment 60 must move past stop 48, the latter is first lowered.

Control station 124 can be of a type known as a pendant station which is suspended from cable 128 containing conductors which conduct control signals from station 124 to computer 126 and indicator signals from computer 126 to station 124. Preferably, cable 128 is connected to station 124 and/or computer 126 by a separable connector, such as a plug-in connector, to permit station 124 and/or cable 128 to be disconnected and stored when not in use.

Station 124 includes a series of pushbutton switches 132, arranged in groups, for identifying the operation to be performed, as indicated by the legends on station 124. The station further includes a handle 134 for the operator and a trigger switch 136. Push buttons 132 and trigger switch 136 are connected to computer 126 via respective conductors of cable 128 so that depression of a selected pushbutton indicates to computer 126 the selected operation to be performed and subsequent depression of trigger switch 136 sends to computer 126 a trigger signal which is processed in computer 126 to cause the selected operation to be performed.

After a pushbutton switch has been pressed, it can remain depressed until another pushbutton switch of the same group has been pressed. For this purpose, the pushbutton switches of each group can be mechanically or electromechanically interconnected.

Each pushbutton switch 132 contains a lamp which is connected via cable 128 to computer 126 to receive illumination signals therefrom. When a switch 132 is pressed, computer 126 sends to the associated lamp a train of illuminating pulses which cause the lamp to emit a blinking light signal. When the selected operation has been completed, i.e. the carriage, hoist or gripper is in the desired position, computer 126 sends to the associated lamp an illuminating signal (AC or DC) which causes the lamp to emit a steady, or continuous, light signal. The lamp continues to emit a steady light signal until the condition which it represents ceases to exist, which will occur only when another pushbutton of the same group has been pressed followed by depression of trigger switch 136.

Thus, when the system is stationary, the lamp of the "Position" group representing the present position of carriage 6, the lamp of the "Hoist" group representing the present vertical position of gripper 20 and the lamp of the "Gripper" group representing the present gripper state will produce a steady light signal. As soon as a different pushbutton of a group is pressed, the lamp associated with that pushbutton will begin to emit a blinking signal, and after trigger switch 136 has then been depressed, the lamp of that group which was previously producing a steady signal will be extinguished.

In a system according to the invention, only one operation can be performed at a time, primarily for safety reasons. Therefore, at any given time, station 124 will either have three lamps emitting a steady light signal or two lamps emitting a steady light signal and one lamp emitting a blinking light signal.

If several pushbuttons are pressed in succession before trigger switch 136 is depressed, the pressing of each pushbutton will cause the lamp of the previously pressed pushbutton to be extinguished and only the last-actuated pushbutton will be effective to determine the operation to be performed.

If, while a previously initiated operation is being performed, trigger switch 136 is released, that operation will be immediately halted. Then, a different pushbutton switch can be pressed, followed by depression of trigger switch 136 to initiate a new operation.

Preferably, computer 126 is further configured to establish the following safety interlocks:

The gripper can disengage only if the hoist is in its lowered position and carriage 6 is in position FC1, RCC or FC2;

Carriage 6 can be moved only if the hoist is in its raised position or if the hoist is in its parked zone and the gripper is disengaged.

According to a further feature of the invention, pendant station 124 is provided with an indicator unit displaying the load on the hoist and/or the position of the hoist. By way of example, FIG. 4 shows station 124 provided with two display members 140 and 142, which may be of the LCD or LED type. Member 140 can display the desired parameter value and member 142 can display an identification of the parameter. In this case, the displays can switch periodically between the two parameters. Alternatively, each member can display a respective parameter value and the parameters can be identified by legends permanently affixed below the respective display members.

Alternatively, as shown in FIG. 4a, the display members 140, 142 can be housed in a separate device 144 provided with clamping members 146 in the form of cable clamps for removably fixing device 144 to cable 128 at a location above station 124, the location being selected to permit convenient viewing of display members 140 and 142. In this embodiment, a separate cable 150 is connected between device 144 and computer 126 for supplying parameter value signals to members 140 and 142.

When such display members are provided, hoist load information can be generated by a conventional load cell 152, shown in FIG. 1, supporting gripper 20 and hoist position information can be generated by a conventional rotation monitor 154, shown in FIG. 2, rotationally coupled to drum 68.

Opening and closing of gripper 20 is controlled in a direct manner by computer 126, in response to operator control at station 124 and preferably with implementation of the safety interlocks described above. The programming for these interlocks involves basic AND and OR functions and can be prepared in a routine manner.

The programming for controlling raising and lowering of the hoist-carrying gripper 20 and for controlling movement of carriage 6, including raising and lowering of movable stop 48, in response to operator control at station 124, can also be prepared in a routine manner based on the specified relationships and is depicted in the programming flow diagrams of FIGS. 5-11.

The desired routine is indicated to computer 126 by pressing of the appropriate pushbutton 132 (FIG. 4) and includes monitoring of the state of trigger switch 136 (FIG. 4) before each movement step. Preferably, each movement is effuctuated in small increments, with each increment being preceded by the illustrated monitoring operations.

FIGS. 5 and 6 show, respectively, the routines for moving the hoist to its lowered position and parked zone. The routine for moving the hoist to its raised position is not shown but will be identical to the routine of FIG. 5, with the first decision block performing the inquiry of whether the hoist is in its raised position and the associated command block being operative to effect movement of the hoist toward its raised position.

FIGS. 7, 9, 10 and 11 show, respectively, the routines for moxing carriage 6 to positions FC1, RCC, FC2 and LOAD. Each of these routines includes a "HOIST MONITORING ROUTINE", which is shown in detail in FIG. 8. These programming flow diagrams are self-explanatory and directly indicate the programming required to control each operation. In these diagrams, the following notations are used:

CP = present carriage position
MSU? = movable stop up?
MSD? = movable stop down?
TSC? = trigger switch closed?

It will be noted that each operation includes bringing the carriage 6 to a suitable intermediate position, INT 1 or INT 2, before lowering or raising movable stop 48, in order to assure that abutments 60 do not interfere with such movements. Thus, positions INT 1 and INT 2 are selected to assure that such interference does not occur.

Figure 3C:
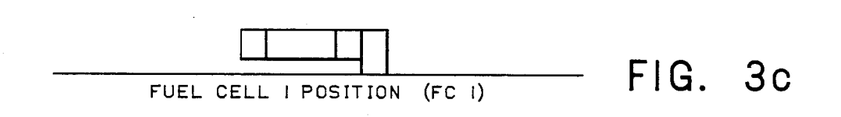
Figure 3D:
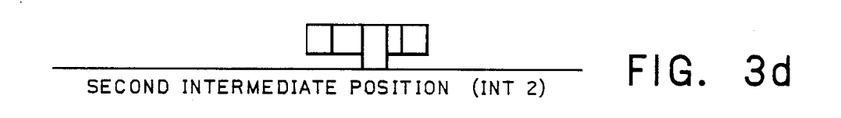

While it will be appreciated that the apparatus according to the present invention can be controlled to carry out any desired operating sequence, one typical sequence will be described for purposes of illustration. Initially, all compartments 10, 12 and 14 are empty and hoist 20 is in its raised position or its parked zone. The gripper is disengaged. Carriage 6 is then moved to the LOAD position and the manipulator crane (not shown) lowers a new or partially spent fuel assembly which is to receive an RCC element into compartment 10. Then a fuel assembly containing an RCC element is lowered by the crane into compartment 14. Carriage 6 is then moved to the FC1 position.

Figure 3E:
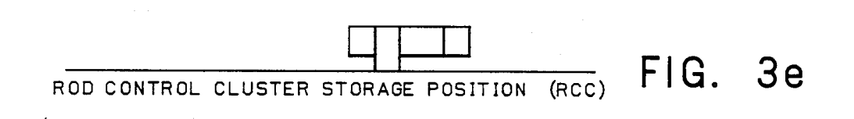
Figure 3F:
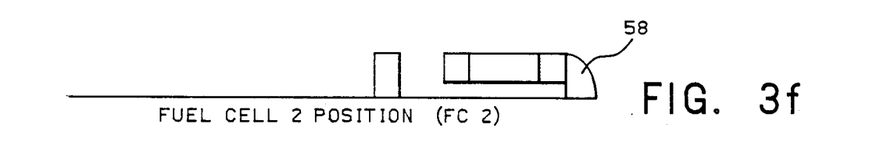

Gripper 20 is then moved to its lowered position, at which time the flexure fingers of gripper 20 penetrate the lifting hub of the RCC element of the fuel assembly located in compartment 14. Gripper 20 is then operated to cause the flexure fingers thereof to grip that element. The flexure fingers are then locked in a radially extended position within the lifting hub of the RCC element. Gripper 20 is then moved to its raised position, after which carriage 6 is moved to the FC2 position. Gripper 20 is then moved to its lowered position, after which the gripper is disengaged to release the RCC element.

Then, the gripper is moved into its parked zone and carriage 6 is moved to the LOAD position. Both fuel assemblies are then removed by means of the manipulator crane.

According to another possible operating sequence, an RCC element can be removed from a fuel assembly for storage. For this purpose, the gripper is again initially moved to its raised position or its parked zone, carriage 6 is moved to the LOAD position and a fuel assembly from which the RCC element is to be removed is loaded by the manipulator crane into compartment 14.

Then, carriage 6 is moved to the FC1 position and gripper 20 is moved to its lowered position, after which the flexure fingers of gripper 20 are caused to engage the lifting hub of the RCC element contained in the fuel assembly. Then gripper 20 is moved to its raised position, after which carriage 6 is moved to its RCC position.

Gripper 20 is then moved to its lowered position to insert the RCC element into compartment 12, after which flexure fingers of gripper 20 are moved to their disengaged position. Then, gripper 20 is moved into its parked zone, carriage 6 is moved to its LOAD position and the fuel assembly is removed from compartment 14 by the manipulator crane.

It will be appreciated that many other operating sequences can be readily performed with the apparatus according to the invention.

It will be understood that the above description of the present invention is susceptible to various modifications, changes, and adaptations, and the same are intended to be comprehended within the meaning and range of equivalents of the appended claims.

I claim:

1. Apparatus for transferring components to and from containers therefor, which apparatus includes:
   a stationary support frame defining a pathway;
   a carriage movable along the pathway and having at least one container compartment for receiving and holding a container and at least one component compartment for receiving and holding a component, said container compartment being spaced from said component compartment along the pathway;
   two stationary stops located to delimit first and second ends of the pathway;
   a movable stop located along the pathway between said stationary stops;
   abutment means carried by said carriage, and disposed to cooperate with said stops so that contact between said abutment means and said stationary stops defines repective first and second end operating positions of said carriage along said pathway and contact between said abutment means and said movable stop defines at least one further operating position of said carriage along said pathway, which further position is spaced from said second end position by a distance equal to the spacing between said container compartment and said component compartment;
   component transfer means for transferring a component vertically to and from a respective one of said compartments when said carriage is in a respective one of said second end and further operating positions;
   signal controllable drive means connected to said carriage for moving said carriage to a selected position along said pathway;
   signal controllable movable stop displacing means coupled to said movable stop for displacing said movable stop between a raised position in which said movable stop can be contacted by said abutment means and a lowered position in which said movable stop can not be contacted by said abutment means; and
   electronic data processing means connected to receive signals indicative of the desired operating position of said carriage and connected to said drive means and movable stop displacing means for operating said drive means and said movable stop displacing means for automatically displacing said carriage to the desired operating position.

2. Apparatus as defined in claim 1 wherein: said carriage has two said container compartments spaced apart along the pathway and separated from one another by said component compartment; and said abutment means are constructed so that there are two said further operating positions of said carriage, said two further operating positions being spaced from one another by a distance equal to the distance between one of said container compartments and said component compartment such that when said carriage is in each of said further operating positions, said component transfer means can transfer a component to and from a respective one of said compartments.

3. Apparatus as defined in claim 1 further comprising carriage position monitoring means operatively connected to said drive means for producing an indication of the position of said carriage along the pathway and to said data processing means for causing said drive means to apply a driving force to said carriage until said position monitoring means produce an indication that said carriage has reached the desired position.

4. Apparatus as defined in claim 3 wherein said signal controllable drive means comprise a drive motor controlled by said data processing means, a rotatable member driven by said motor, and a cable connected to said carriage and connected to be driven by said rotatable member for displacing said carriage along said pathway, and said carriage position monitoring means are connected directly to said rotatable member.

5. Apparatus as defined in claim 3 wherein said carriage position monitoring means are set for causing said drive means to apply a driving force to said carriage for a short time after said abutment means have contacted that one of said stops which defines that position.

6. Apparatus as defined in claim 1 wherein said component transfer means comprise gripping means for gripping a component and hoist means connected to said gripping means for moving said gripping means over a vertical path between a raised position and a lowered position, said raised position being at a height to cause a component gripped by said gripping means to be completely above said compartments and said lowered position being at a height such that a component gripped by said gripping means is fully inserted into a given compartment when said carriage is in a position such that said given compartment is located directly below said component transfer means.

7. Apparatus as defined in claim 6 wherein said data processing means operate to receive indications of the position of said gripping means along the vertical path and of whether said gripping means are gripping a component and utilize such indication to prevent movement of said carriage when a component extends into a said compartment and is being gripped by said gripping means.

8. Apparatus as defined in claim 7 wherein said gripping means are movable between an engaged position for gripping a component and a disengaged position for releasing a component, and further comprising manually actuable control signal generating means connected to said data processing means for generating and supplying to said data processing means the signals indicative of desired positions of said carriage, and said hoist and the desired operating state of said gripping means, said manually actuable control signal generating means comprising: a first plurality of manually actuable elements each associated with a respective one of said carriage positions; a second plurality of manually actuable elements each associated with a respective one of said hoist positions; a third plurality of actuable elements each associated with a respective operating state of said gripping means; and a plurality of light emitting elements each associated with a respective manually actuable element, said manually actuable elements and said light emitting elements being electrically connected to said data processing means so that said data processing means are responsive to actuation of a said manually actuable element for causing said light emitting element which is associated with the actuated manually actuable element to initially emit a blinking light signal and to subsequently emit a steady light signal when the desired position associated with the actuated manually actuable element has been reached.

9. Apparatus as defined in claim 1 wherein said movable stop is pivotable between said raised and lowered positions, said movable stop displacing means comprise an electrically controllable, movable drive member and a cable connected between said drive member and said movable stop for moving said movable stop between its said positions, and said drive member is connected to be controlled by said data processing means for moving said movable stop to its said lowered position each time said carriage is to be moved through said further operating position.

10. Apparatus as defined in claim 1 further comprising manually actuable control signal generating means connected to said data processing means for generating and supplying to said data processing means the signals indicative of the desired position of said carriage.

11. Apparatus as defined in claim 10 further comprising indicator means associated with said control signal generating means and connected for displaying an indication of a parameter associated with transferring a component to or from a compartment.

12. Apparatus as defined in claim 10 wherein said manually actuable control signal generating means comprise a plurality of manually actuable elements each associated with a respective one of said carriage positions and a plurality of light emitting elements each associated with a respective manually actuable element, said manually actuable elements and said light emitting elements being electrically connected to said data processing means so that said data processing means are responsive to actuation of a said manually actuable element for causing said light emitting element which is associated with the actuated manually actuable element to initially emit a blinking light signal and to subsequently emit a steady light signal when the desired position associated with the actuated manually actuable element has been reached.

13. Apparatus as defined in claim 1 constituting a changing fixture in a nuclear reactor installation, wherein each container is a reactor core fuel assembly and each component is a rod control cluster.

* * * * *